United States Patent [19]
Kondo

[11] Patent Number: 5,369,252
[45] Date of Patent: Nov. 29, 1994

[54] COOKING APPLIANCE AND METHOD WITH A LIGHT SENSOR

[75] Inventor: Tomoyuki Kondo, Aichi, Japan

[73] Assignee: Kabushiki Kaisha Toshiba, Kawasaki, Japan

[21] Appl. No.: 71,064

[22] Filed: Jun. 4, 1993

[30] Foreign Application Priority Data

Jun. 5, 1992 [JP] Japan .................................. 4-145379

[51] Int. Cl.$^5$ .............................................. H05B 6/68
[52] U.S. Cl. .................... 219/704; 219/685;
219/763; 219/518; 219/502; 99/325
[58] Field of Search ................. 219/10.55 B, 502, 518,
219/704, 705, 706, 762, 763, 685; 73/620, 624,
618; 99/325, 451

[56] References Cited

U.S. PATENT DOCUMENTS

| | | | |
|---|---|---|---|
| 3,979,056 | 9/1976 | Barnes | 235/92 MT |
| 4,187,545 | 2/1980 | Wallace et al. | 364/559 |
| 4,195,522 | 4/1980 | Anderson et al. | 73/229 |
| 4,426,572 | 1/1984 | Tachikawa et al. | 219/10.55 B |
| 4,591,708 | 5/1986 | Shu . | |
| 4,868,357 | 9/1989 | Serikawa et al. | 219/10.55 B |

FOREIGN PATENT DOCUMENTS

| | | |
|---|---|---|
| 264935 | 4/1988 | European Pat. Off. . |
| 271899 | 6/1988 | European Pat. Off. . |
| 4-10389 | 4/1992 | Japan . |
| 1375679 | 11/1974 | United Kingdom . |

OTHER PUBLICATIONS

Patent Abstracts of Japan, vol. 15, No. 143, (E-1054) Jan. 1991, JP3020990.
Patent Abstracts of Japan, vol. 13, No. 591, (M-913) Oct. 1989, JP1247915.
Patent Abstracts of Japan, vol. 13, No. 13, (M-783) Sep. 1988, JP63223423.

Primary Examiner—Philip H. Leung
Attorney, Agent, or Firm—Cushman, Darby & Cushman

[57] ABSTRACT

A microwave oven has a photosensor to detect an objected in a cooking compartment. The photosensor, including a light emitter and a light receiver, detects whether a turntable is absent or present in the cooking compartment. The light emitter projects a plurality of pulses of light in sequence. A controller counts the number of pulses of light detected by the light receiver and controls the oven based on the number of pulses of light detected as compared to the number of pulses of light emitted.

11 Claims, 3 Drawing Sheets

COOKING APPLIANCE AND METHOD WITH A LIGHT SENSOR

BACKGROUND OF THE INVENTION

The present invention relates to a cooking appliance having a photosensor which detects the presence of an object placed within its cooking compartment.

A prior microwave oven is disclosed in Japanese laid-open Patent Application 4-10389. In the disclosed microwave oven, a photosensor including a light emitter, such as a LED, and a light receiver, using a phototransistor, is provided on a side wall of its cooking compartment. The photosensor detects whether the light receiver is illuminated with light from the light emitter. A microcomputer determines the height of food in the cooking compartment and presence of any attachment used in cooking, such as an oven plate for oven cooking or a turntable for microwave cooking, based on the output of the photosensor.

For example, if no turntable is present, the light receiver can receive light- from the light emitter through the cooking compartment. More specifically, the light emitter generates light in a single pulse. The microcomputer determines whether a voltage, generated by the light receiver in response to detecting light, exceeds a predetermined voltage. If the voltage is lower than the predetermined voltage, the microcomputer determines that the turntable is in the cooking compartment, and microwave cooking is desired. If the voltage is higher than the predetermined voltage, the microcomputer determines the turntable is not in the cooking compartment, and oven cooking is desired. The microwave oven automatically cooks food based on the determination of the microcomputer.

When the light receiver is illuminated, however, the microcomputer sometimes fails to detect the presence of the turntable because the light receiver output is affected by electrical or optical noise. When the photosensor also detects the size of food in the compartment, a similar problem can occur. These failures can cause an erroneous mode of cooking.

SUMMARY OF THE INVENTION

It is an object of the present invention to provide a cooking appliance and method which can minimize erroneous automatic cooking mode selection due to erroneous detection of items in the cooking compartment.

In order to achieve the above object, in the present invention, plural pulses of light are projected in sequence through an oven compartment. The number of light pulses passing through the oven compartment are counted. The counted number is used to control actuation of a heating means.

BRIEF DESCRIPTION OF THE DRAWINGS

These and other objects and advantages of this invention will become apparent and more readily appreciated from the following description of the presently preferred exemplary embodiment, taken in conjunction with the accompanying drawings, of which.

DETAILED DESCRIPTION OF THE PRESENTLY PREFERRED EXEMPLARY EMBODIMENT

An embodiment will now be described in which the present invention is implemented as a microwave oven with an oven heater.

Figure 2:
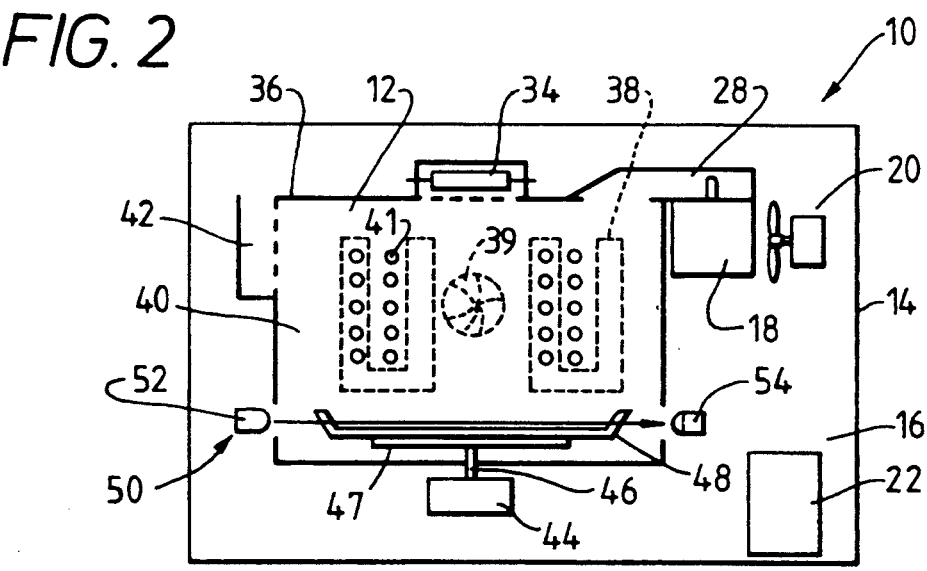
FIG. 2 is a vertical sectional view of the cooking appliance.
Figure 3:
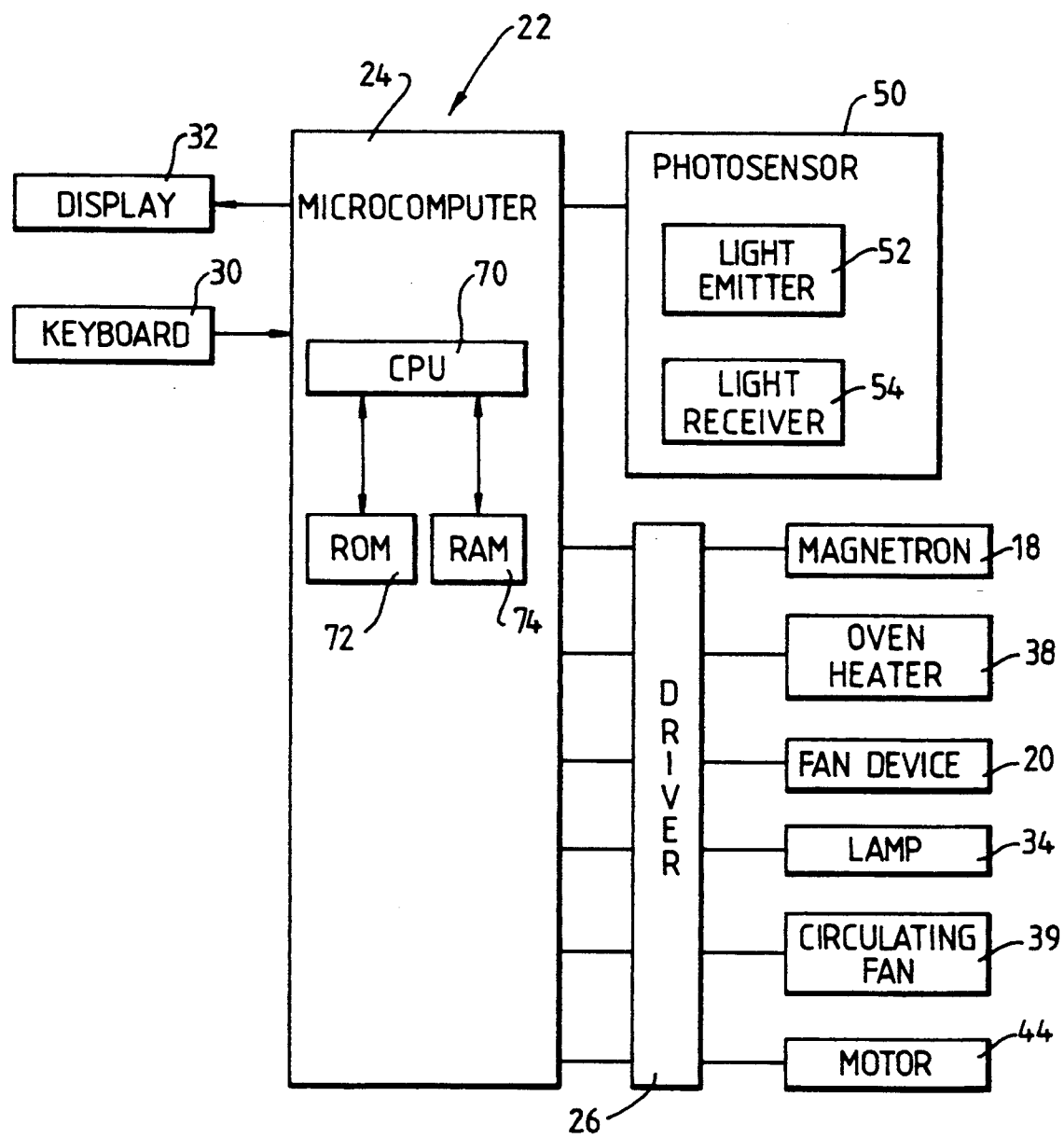
FIG. 3 is a block diagram showing an electrical arrangement of the cooking appliance.

With reference to FIG. 2, a microwave oven 10 has a cooking compartment 12 for holding food. Cooking compartment 12 is in an outer case 14. A door provides access to cooking compartment 12. A components area 16 is provided between cooking compartment 12 and outer case 14. A magnetron 18, a fan device 20 which cools the magnetron, and a controller 22, including microcomputer 24 (see FIG. 3) which controls the magnetron and the fan device, are provided in components area 16. Magnetron 18 is coupled to controller 22 through a driver 26, and is connected to cooking compartment 12 through a microwave duct 28. Magnetron 18 supplies microwave energy into cooking compartment 12 through microwave duct 28 to heat food in cooking compartment 12. A keyboard 30 and a display 32 (see. FIG. 3), which are coupled to controller 22, are positioned at the front of components area 16.

A lamp 34 is provided above a top surface 36 of cooking compartment 12. An oven heater 38 and a circulating fan 39 are located behind a rear wall 40 of cooking compartment 12. Air heated by oven heater 38 is supplied into cooking compartment 12 through plural holes 41 in rear wall 40 as circulated by fan 39. Oven heater 38 and circulating fan 39 are coupled to controller 22 through driver 26, and are controlled by controller 22. An exhaust duct 42 is located on a left side of cooking compartment 12.

A motor 44 is provided on a outside base of cooking compartment 12, and an drive shaft 46 thereof penetrates through the base into cooking compartment 12. A rotatable arm 47 is attached to an end of drive shaft 46. A detachable turntable 48 is set on a top of rotatable arm 47. Turntable 48 is one kind of cooking attachment, for use in microwave cooking. During microwave cooking, food is placed on turntable 48 in cooking compartment 12. During the oven cooking mode using heater 38, a baking tray is used instead of turntable 48, and the baking tray is set in cooking compartment 12.

A transmission type photosensor 50, including a light emitter 52 and a light receiver 54, which detects the size (height) of an item such as food to be heated and the presence or absence of the cooking attachment, are provided on opposite sides of cooking compartment 12. Thus, light emitter 52 and light receiver 54 are located facing each other at a position a bit higher than that of rotatable arm 47. With reference to FIG. 2, when turntable 48 is set on rotatable arm 47, the turntable is positioned to interrupt light emitted by light emitter 52. As a result, light receiver 54 cannot receive the light. Light emitter 52 and light receiver 54 are coupled to controller 22, and controller 22 controls operation of light emitter 52 to project light, and receives a signal from light receiver 54. Therefore, controller 22 determines whether turntable 48 is present or not based on the signal from light receiver 54.

Figure 4:
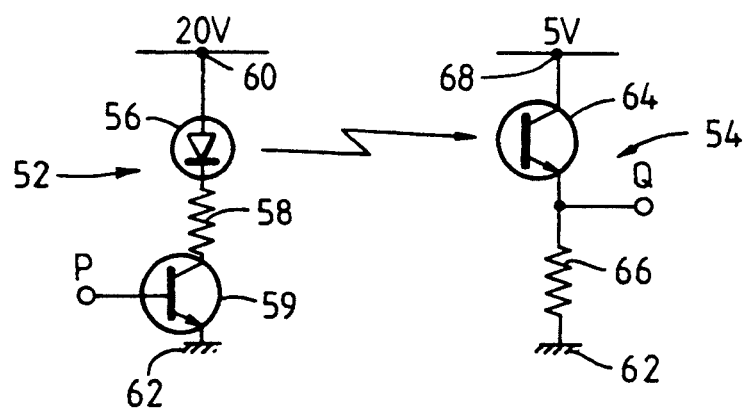
FIG. 4 shows the cooperation between a light emitter and a light receiver of the cooking appliance.
Figure 5:
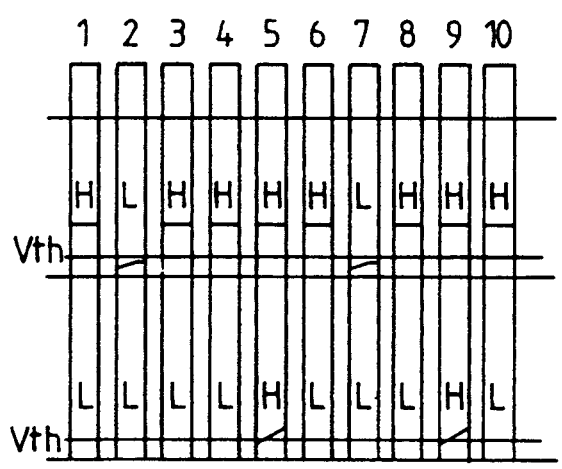
FIG. 5 shows signals of a P point and a Q point in FIG. 4.

With reference to FIG. 4, in light emitter 52, an emitting device 56, such as a LED, a resistor 58, and a NPN transistor 59 are connected in series across 20 volts between a power terminal 60 and ground 62. A collector of transistor 59 is connected to resistor 58, and an emitter thereof is connected to ground 62. A base of transistor 59 is connected to an input terminal P through which a command from controller 22 is received. In light receiver 54, a phototransistor 64 and a resistor 66 are connected in series across 5 volts between a second power terminal 68 and ground 62. An output terminal Q is connected between an emitter of phototransistor 64 and resistor 66. An output signal related to the strength of light received by light receiver 54 is sent to controller 22 through output terminal Q. The output signal is converted to binary form, that is, a high level (H) or low level (L), on the basis of a comparison with a prescribed threshold value Vth (as shown in FIG. 5). Either a high level (H) or a low level (L) signal is sent to controller 22.

As shown in FIG. 3, controller 22 includes CPU 70, ROM 72 in which a program is stored, and RAM 74. Controller 22 carries out the program stored in ROM 72 based on instructions from keyboard 30 operated by a user so that microwave oven 10 cooks food. For example, when a user selects automatic cooking, photosensor 50 detects a presence or absence of turntable 48. Controller 22 determines whether to use microwave cooking or oven cooking based on this determination. In detail, emitting device 56 projects light plural times, for instance ten times, as controlled by software stored in ROM 72, and phototransistor 64 receives the light. Controller 22 determines whether or not turntable 48 is present based on the plural signals sent to the controller from phototransistor 64.

The operation of microwave oven 10 will be described with reference to FIG. 5. A user places food with any required cooking attachment into cooking compartment 12. When the user presses a start key on keyboard 30, controller 22 commands photosensor 50 to detect a presence or absence of turntable 48 so that the controller determines whether to perform microwave cooking or oven cooking. To accomplish the detection, controller 22 sends ten photoemission command signals to input terminal P of light emitter 52 as shown by waveform a in FIG. 5. Emitting device 56 projects a series of ten flashes due to the command signals. Controller 22 checks ten signals received by light receiver 54 in accordance with ten flashes emitted by emitting device 56.

When turntable 48 is not set in cooking compartment 12, phototransistor 64 receives light from emitting device 56. As a result, the output voltage of output terminal Q for all pulses exceeds threshold value Vth, so all detection signals should be an H level. When turntable 48 is set in cooking compartment 12, phototransistor 64 does not receive as much light from emitting device 56. As a result, the output voltage of output terminal Q for all pulses does not exceed threshold value Vth, so all detection signals should be at an L level.

When interference occurs from electrical or optical noise, conversion of the detection signals to binary form, might cause an original H level to become an L level, and an original L level might become an H level in error. A situation where noise is introduced into the second and seventh pulses of the ten pulse series is shown by b in FIG. 5. A situation when noise is introduced into the fifth and ninth pulses of the ten pulse series is shown by c in FIG. 5. In this embodiment, when the number of H level signals which controller 22 receives from light receiver 54 is at least seven out of the ten pulses, controller 22 determines that turntable 48 is absent. When the number of H level signals is less than 7, controller 22 determines that turntable 48 is present.

Figure 1:
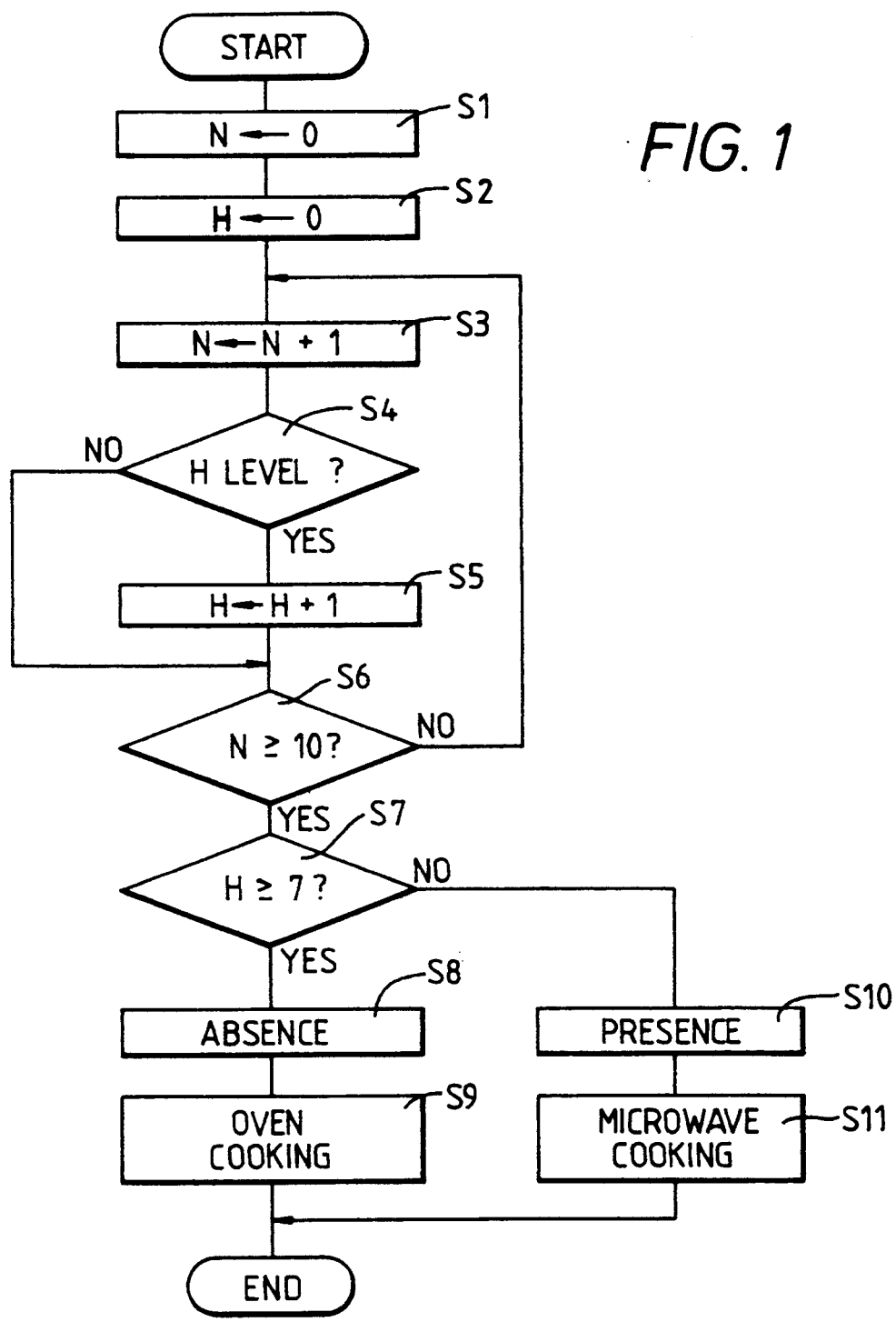
FIG. 1 is a flow chart illustrating operation of a cooking appliance according to the present invention.

As illustrated in FIG. 1, controller 22 begins the process of determining whether turntable 48 is present by setting to "0" a value N of a counter which counts the number of input signals sent to input terminal P of light emitter 52 (step S1). A value H of a counter which counts the number of H level signals produced by light receiver 54 is set to "0" (step S2). Controller 22 sends one pulse photoemission command signal to input terminal P, and increments the count value N (step S3). Then at step S4, controller 22 determines whether the corresponding detection signal which is sent to the controller is an H level. If so, controller 22 increments the count value H. If not, the count value H is maintained. Controller 22 then determines whether the count value N is at least 10 (step S6). When light emitter 52 projects light 10 times, the result in step S6 becomes "YES", and flow progresses to a next step S7. If light emitter 52 projects light less than 10 times, the result in step S6 is "NO", and flow returns back to step S3.

At step S7, controller 22 determines whether the count value H is at least 7. If so, the ratio of H/N is at least 70%. Therefore, controller 22 determines that turntable 48 is absent and that oven cooking should be performed (step S8). Then, controller 22 sends a signal to oven heater 38 in accordance with the program (step S9). If, at step S7, the count value H is less than 7, controller 22 determines that turntable 48 is present and that microwave cooking should be performed (step S10). Then, controller 22 sends a signal to magnetron 18 in accordance with the program (step S11).

According to the embodiment, if the H level signal is produced at least 7 times out of 10 detecting signals, controller 22 determines that turntable 48 is absent. Therefore, even though the detecting signal has noise sufficient to reverse the detected level, controller 22 can minimize the misdetermination of the presence or absence of turntable 48. Even though noise is sometimes so strong that an additional noise filter cannot remove the noise and therefore, the noise is included in the detecting signal, controller 22 can precisely determine the presence or absence of turntable 48.

Instead of detecting the presence or absence of turntable 48, photosensor may, for example, detect a presence or absence of the baking tray, detect a size or height of food or the cooking attachment.

Instead of a transmission type photosensor, a reflecting type photosensor is also suitable. The number of times that light emitter projects light may be changed, and the ratio (H/N), that is, the basis of determination may also be changed.

Although only a single preferred embodiment of this invention has been described in detail above, those skilled in the art will certainly understand that many modifications are possible in the preferred embodiment without departing from the teachings thereof.

All such modifications are intended to be encompassed within the following claims.

What is claimed is:
1. A cooking appliance, comprising:
a chamber in which cooking is performed;

means for generating heat in said chamber, said generating means being disposed proximate said chamber;

means for emitting a plurality of pulses of light in sequence across said chamber;

means for detecting the pulses of light disposed in said chamber; and control means, coupled to the detecting means, for detecting the presence or absence of an object in said chamber by counting the number of pulses of light detected by the detecting means, and for controlling the generating means based on the counted number.

2. A cooking appliance according to claim 1, wherein the detecting means includes means for detecting a size of food.

3. A cooking appliance according to claim 1, wherein the detecting means includes means for detecting a presence of an attachment used in cooking.

4. A cooking appliance according to claim 1, wherein the generating means includes a magnetron for microwave cooking and an electric heater for oven cooking.

5. A cooking appliance according to claim 4, wherein the control means includes means for actuating either the magnetron or the electric heater based on the counted number.

6. A cooking appliance according to claim 1, wherein the control means controls the generating means based upon whether the counted number is more than 70% of the number of pulses of light emitted by the emitting means.

7. A cooking appliance, comprising:

a cooking compartment for receiving a food;

a magnetron, coupled to the cooking compartment, for microwave cooking food in the cooking compartment and an electric heater for oven cooking food in the cooking compartment;

detecting means, including a light emitter and a fight receiver disposed across the cooking compartment from said emitter, for detecting at least one of a size of the food and a presence of an attachment used in cooking, the light emitter emitting a plurality of pulses of light in sequence; and control means, responsive to the detecting means, or counting the number of pulses of light detected by the light receiver, for determining a presence or absence of said food or attachment based on the counted number and for operating the magnetron and the electric heater if the counted number is below a threshold value.

8. A cooking appliance according to claim 7, wherein the control means controls the magnetron and electric heater based upon whether the converted number is more or less than 70% of the number of pulses of light emitted by the light emitter.

9. A method of operating a cooking appliance which includes means for generating heat, comprising the steps of:

emitting a plurality of pulses of light in sequence across a cooking compartment;

detecting pulses of light actually received by a light detector;

counting the number of pulses of light detected the detecting step;

determining the presence or absence of an object in the cooking compartment in response to the counted number; and controlling the generating means based on the determination of presence or absence based on the counted number.

10. A method of operating a cooking appliance according to claim 9, wherein the controlling step includes a step of controlling the generating means based upon whether the counted number is at least 70% of the number of pulses of light emitted by the emitting step.

11. A method of operating a cooking appliance according to claim 9, wherein the controlling step includes actuating a microwave source or an electric heater based on the counted number.

* * * * *